Aug. 29, 1967     A. M. ARCHER     3,339,194
PHOTOSENSITIVE INTRUDER DETECTING SYSTEM USING
ALTERNATELY CHARGED REACTANCE
Filed June 26, 1964     2 Sheets-Sheet 1

INVENTOR
ANDREW M. ARCHER
BY
*Ernest A. Brown*
ATTORNEY

Aug. 29, 1967

A. M. ARCHER 3,339,194

PHOTOSENSITIVE INTRUDER DETECTING SYSTEM USING
ALTERNATELY CHARGED REACTANCE

Filed June 26, 1964

INVENTOR
ANDREW M. ARCHER

BY
Ernest A. Jerren
ATTORNEY

United States Patent Office 3,339,194
Patented Aug. 29, 1967

3,339,194
PHOTOSENSITIVE INTRUDER DETECTING SYSTEM USING ALTERNATELY CHARGED REACTANCE
Andrew M. Archer, New York, N.Y., assignor to Specialties Development Corporation, Belleville, N.J., a corporation of New Jersey
Filed June 26, 1964, Ser. No. 378,129
7 Claims. (Cl. 340—258)

ABSTRACT OF THE DISCLOSURE

The present invention relates to intruder detecting systems, and, more particularly, to an improved photoelectric system which utilizes ambient light to detect the presence of motion of an object or person within an area including a photocell cooperating with a capacitor which discharges to produce an output upon being charged unequally at opposite sides in sequence.

---

Photoelectric systems which utilize ambient light and two or more light sensitive cells have been proposed heretofore but have been found to have a number of inherent difficulties. For example, the cells must be matched in sensitivity over a wide range of different levels of light intensity so as not to cause an unbalance effecting the operation of the system. Also, any mismatch of the detectors makes it necessary to balance the sensitivity of the detecting networks when changing from one range of ambient light intensity to another so that changes in ambient light intensity will not cause the system to respond.

Accordingly, an object of the present invention is to provide a photoelectric detecting system of the foregoing type which is not subject to the foregoing difficulties and disadvantages.

Another object is to provide such a system which will not be put out of balance due to the deterioration of electrical components.

A further object is to provide such a system which is simple and economical in construction and is conveniently installed.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system which comprises an electrical element responsive to light to change electrical values thereof and having a surface exposed to ambient light, means for alternately exposing two portions of the surface of the element to an equal higher and lower light intensity, reactance means such as a capacitor or an inductance coil, a power source co-ordinated with the light exposing means and the element and arranged to alternately charge opposite sides of the reactance means with current of opposite polarities upon alternate exposure of the two surface portions of the element, whereby the reactance means discharges to produce an output upon being charged unequally at opposite sides in sequence, and means responsive to the output of the reactance means for rendering an alarm.

Figure 1:
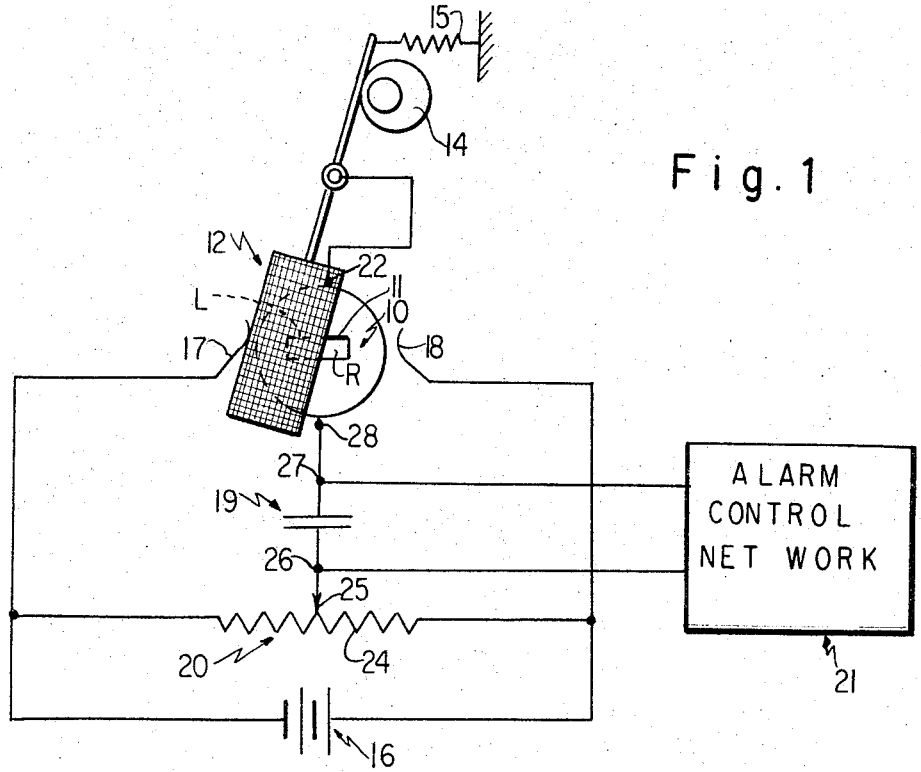
FIG. 1 is a schematic view of one embodiment of the present invention and a circuit diagram of a network used in conjunction therewith.

Referring now to detail to FIG. 1 of the drawings, there is shown an intruder detecting system in its simplest form for practicing the present invention which comprises a photocell 10 having a window 11 exposed to ambient light, a pivotally mounted shutter or light chopper 12 for alternately covering and exposing the left and right portions R and L of the window, a motor driven cam 14 and a return spring 15 for oscillating the shutter, a source of unidirectional current such as a battery 16, switch contacts 17 and 18, a capacitor 19, a potentiometer 20, and a conventional alarm control network 21 for detecting and amplifying a signal to operate an alarm relay. Alarm control networks of this type are shown in U.S. Patents 3,061,829; 3,050,720; 2,794,974; 2,247,246; and 2,217-797.

The cell 10 may be of the cadmium sulfide type which changes in resistance in response to changes in ambient light intensity. If desired, other light sensitive cells or devices may be utilized such as vacuum phototubes, photodiodes, photomultipliers, and the like.

The switch contacts 17 and 18 are respectively connected to the terminals of the battery 16, the shutter 12 serves as a conductive switch blade for alternately engaging the switch contacts, and the shutter is electrically connected to one terminal 22 of the cell 10 to reverse the flow of current through the cell as the shutter oscillates between the contacts.

The potentiometer 20 includes a resistor 24 connected across the terminals of the battery and an adjustable voltage dividing contact 25 for connecting the resistor to one terminal 26 of the capacitor 19. The other terminal 27 of the capacitor is connected to the other terminal 28 of the cell 10 to alternately charge opposite sides of the capacitor 19 with current of opposite polarities upon switching action of the shutter and the resulting alternate exposure of the two window portions L and R.

The alarm control network 21 is connected across the terminals 26 and 27 of the capacitor 19 to detect and amplify the output of the capacitor and to cause an alarm to be given in a conventional manner.

In operation, with the potentiometer arranged to balance the cell 10 and impress an equal voltage at both sides of the capacitor, the cell window portions L and R are alternately exposed to ambient light and the sides of the capacitor 19 are alternately connected to the battery terminals through the cell as the switch contacts 17 and 18 are alternately engaged by the shutter 12.

When there is no intruder in the area viewed by the window of the cell, the window portions L and R are exposed to ambient light of equal intensity, and the cell does not respond, whereby the capacitor is charged equally at opposite sides in sequence and has no output.

However, when there is an intruder in the area, the ratio of the intensities of the light viewed by each portion of the cell window changes and the resistance of the cell changes and the voltage impressed on the capacitor at opposite sides is different upon alternate exposure of the cell window portions, whereby the capacitor is charged unequally at opposite sides in sequence and the difference in charge produces an output for operating the alarm control network.

Figure 2:
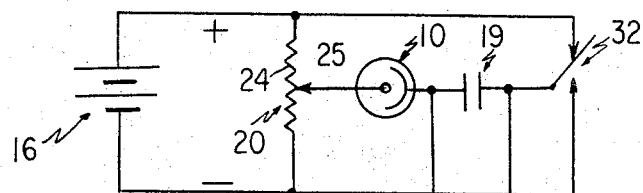
FIG. 2 is a circuit diagram of a network illustrating another embodiment of the invention.
Figure 3:
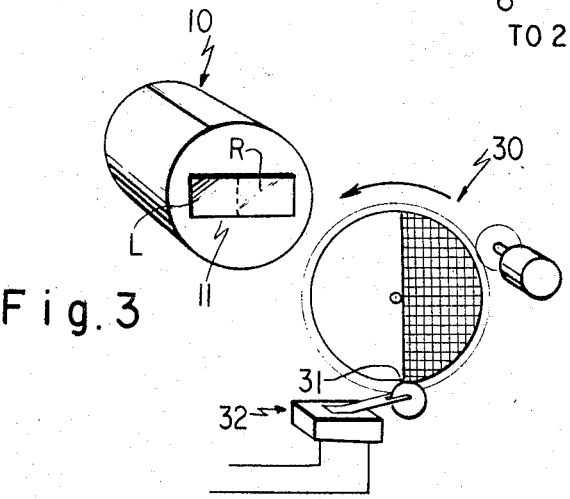
FIG. 3 is a schematic perspective view of current reversing means used in conjunction with the network shown in FIG. 2.

In FIGS. 2 and 3, a network is shown which is basically the same in arrangement and operation as that described in connection with FIG. 1, except that the shutter or light chopper is a motor driven disc 30 which is half transparent and half opaque to alternately expose the window portion L and R to ambient light, and that the disc has a cam surface 31 thereon which operates a single pole, double throw microswitch 32 to reverse the current flow through the cell 10. Alternately, the shutter disc would be provided with a commutator ring engaged by brushes or any other conventional current reversing switch arrangement could be utilized.

Figure 4:
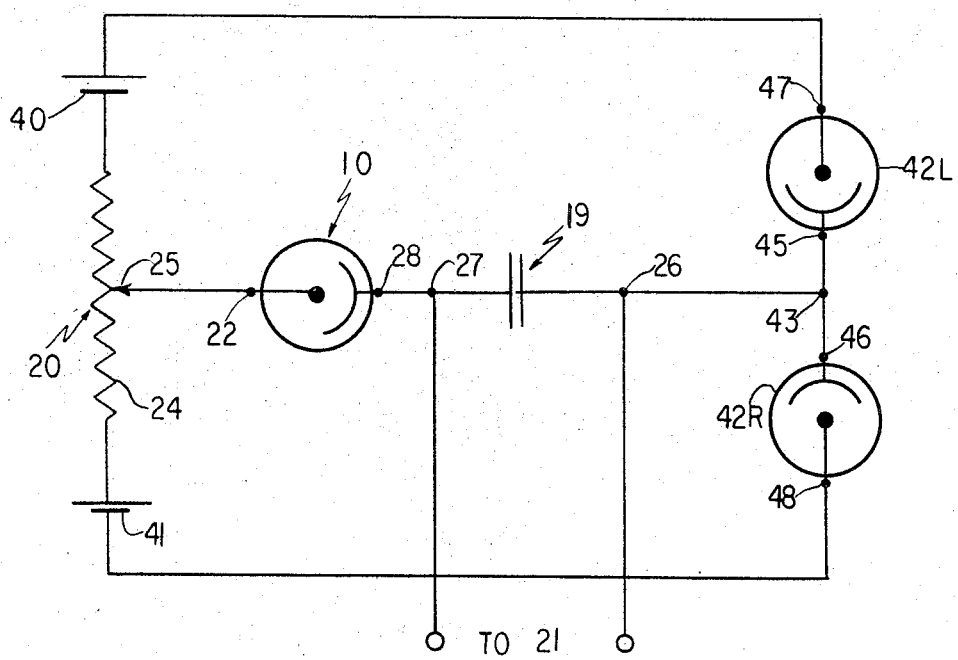
FIG. 4 is a circuit diagram of a network illustrating still another embodiment of the invention.
Figure 5:
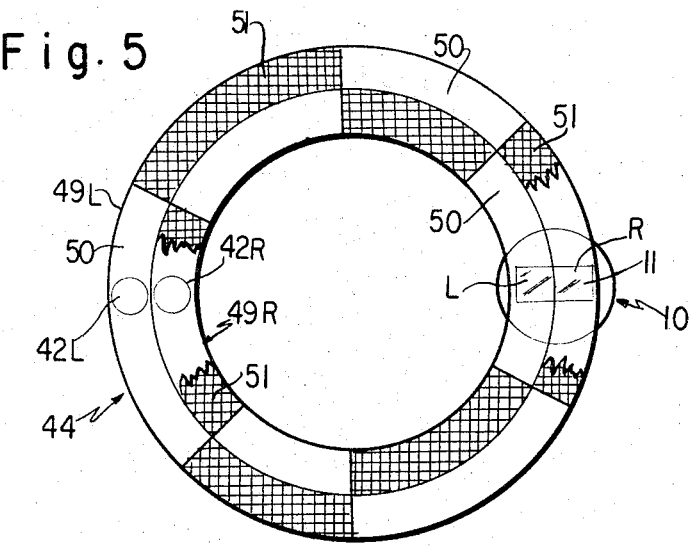
FIG. 5 is a schematic elevational view of a disc for controlling the current reversing arrangement shown in FIG. 4.

In FIG. 4 and 5, a network is shown which eliminates switch contacts and relies on light sensitive cells to effect reversal of the current flow through the cell 10. This network includes the cell 10, the capacitor 19, the potentiometer 20, and the alarm control network 21, and in addition also includes a pair of batteries 40 and 41, a pair of light responsive cells 42L and 42R such as selenium cells, and a more elaborate motor driven shutter disc 44 for alternately exposing the window portion L and R and the cells 42L and 42R to ambient light in the manner described hereinafter.

The resistor 24 of the potentiometer 20 has one end connected to the negative terminal of the battery 40 and has its other end connected to the positive terminal of the battery 41 which in effect provides a power source equivalent to connecting the resistor across a single battery as shown in FIG. 1; and the voltage dividing contact 25 of the potentiometer is connected to the terminal 22 of the cell 10. The cell 10 and the capacitor 19 are in series with the cell terminal 28 connected to the capacitor terminal 27. The cells 42L and 42R are connected in series and across the resistor and battery arrangement with the terminal 45 of the cell 42L connected to the terminal 46 of the cell 42R, the terminal 47 of the cell 42L connected to the positive terminal of the battery 40 and the terminal 48 of the cell 42R connected to the negative terminal of the battery 41. The terminal 26 of the capacitor is connected between the cell terminals 45 and 46 at 43.

The shutter disc 44 has two adjacent concentric annular zones 49L and 49R each of which has alternately transparent and opaque arcuate sections 50 and 51 of equal circumferential extent with the transparent sections of one zone being adjacent the opaque sections of the other zone. The cells and the disc are arranged so that the zones 49L and 49R respectively are in the field of view of the window portions of cells 42L and 42R and the window portions L and R of the cell 10 at a point spaced circumferentially from the point where the cells 42L and 42R are located so that the cell window portion L and the cell 42L are simultaneously exposed to ambient light while the cell window portion R and the cell 42R are covered and vice versa.

In operation, when the cell window portion L and the cell 42L and the cell window portion R and the cell 42R are alternately exposed to ambient light, the resistance of the network is such that current flow to the capacitor 19 is alternated.

When there is no intruder in the area viewed by the window of the cell 10, the window portions L and R are exposed to ambient light of equal intensity and the cell 10 does not respond, whereby the capacitor 19 is charged equally at opposite sides in sequence and has no output.

However, when there is an intruder in the area, the intensity of the ambient light viewed by each of the two window portions of the cell 10 is different, the resistance of the cell 10 changes and the voltage impressed on the capacitor 19 at opposite sides is different upon alternate exposure of the window portions L and R of the cell 10, whereby the capacitor is charged unequally at opposite sides in sequence and the difference in charge produces an output which is fed into the alarm control network.

From the foregoing description, it will be seen that the present invention provides an intruder detecting system which is not subject to the disadvantages of using a light beam from a light source, or a pair of light sensitive cells which must have like characteristics throughout a wide range of ambient light intensity. In the present system, the single sensing cell does not respond to changes in the level of ambient light intensity since it is self balancing, and its range is limted and controlled only by the range of the optical system used in conjunction with the sensing cell for viewing the area where motion is to be detected. Thus, the present system can be used effectively for monitoring motion appearing through simple lens, or the lens of a microscope or a telescope. Also, the optical system may be arranged to provide a short depth of focus to detect motion at discrete distances along the optical axis.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. An ambient light responsive system for detecting the presence of an intruder within any portion of an area under surveillance comprising an electrical element responsive to light to change electrical values thereof and having a surface exposed to and responsive to changes in ambient light reflected from said area which reflected light is changed in intensity by the presence of an intruder that reflects light to a different degree than the portion of the area obscured by the intruder, means for alternately exposing two portions of the surface of said element to an equal higher and lower light intensity, reactance means, a source of unidirectional current for impressing a charge on said reactance means, current reversing means co-ordinated with said light exposing means and said element to alternately charge opposite sides of said reactance means with current of opposite polarities upon alternate exposure of the two surface portions of said element, said element being connected to vary the current flowing through said reactance means in response to the light intensity on said surface, whereby said reactance means discharges to produce an output upon being charged unequally at opposite sides in sequence, and means responsive to the output of said reactance means for rendering an alarm.

2. A system according to claim 1, wherein said light exposing means includes a shutter.

3. A system according to claim 2, wherein said current reversing means includes a pair of light sensitive cells, and said shutter is constructed and arranged to alternately render one cell effective and the other cell ineffective.

4. An ambient light responsive system for detecting the presence of an intruder within any portion of an area under surveillance comprising an electrical element responsive to light to change electrical values thereof and having a surface exposed to and responsive to changes in ambient light reflected from said area which reflected light is changed in intensity by the presence of an intruder that reflects light to a different degree than the portion of the area obscured by the intruder and having first and second terminals, means for alternately exposing two portions of the surface of said element to an equal higher and lower light intensity, reactance means having a first terminal connected to the first terminal of said element and having a second terminal, a source of unidirectional current for impressing a charge on said reactance means, a potentiometer including a resistor connected for current flow therethrough from said source and a contact connecting said resistor to the second terminal of said reactance means, switching means co-ordinated with said light exposing means and said element including contacts for alternately connecting opposite sides of said source to the second terminal of said element to alternately charge opposite sides of said reactance means with current of opposite polarities upon alternate exposure of the two surface portions of said element, whereby said reactance means discharges to produce an output upon being charged unequally at opposite sides in sequence, and means responsive to the output of said capacitor means for rendering an alarm.

5. A system according to claim 4, wherein said light exposing means include a shutter.

6. An ambient light responsive system for detecting the presence of an intruder within any portion of an area under surveillance comprising an electrical element responsive to light to change electrical values thereof and having a surface exposed to and responsive to changes in ambient light reflected from said area which reflected light is changed in intensity by the presence of an intruder that reflects light to a different degree than the portion of the area obscured by the intruder, and having first and second terminals, means for alternately exposing two portions of the surface of said element to an equal higher and lower light intensity including a shutter, reactance means having a first terminal connected to the first terminal of said element and having a second terminal, a source of unidirectional current for impressing a charge on said reactance means, a potentiometer including a resistor connected for current flow therethrough from said source and a contact connecting said resistor to the second terminal of said element, current reversing means co-ordinated with said light exposing means and said element including a pair of light sensitive cells connected in series and across said resistor and said source and including means on said shutter constructed and arranged to alternately render one cell effective and the other cell ineffective to change the resistance values of the cells to effect current flow reversal and thereby alternately charge opposite sides of said reactance means with current of opposite polarities upon alternate exposure of the two surface portions of said element, said reactance means having its second terminal connected between said cells, whereby said reactance means discharges to produce an output upon being charged unequally at opposite sides in sequence, and means responsive to the output of said capacitor for rendering an alarm.

7. An ambient light responsive system for detecting the presence of an intruder within any portion of an area under surveillance comprising an electrical element responsive to light to change electrical values thereof and having a surface exposed to and responsive to changes in ambient light reflected from said area which reflected light is changed in intensity by the presence of an intruder that reflects light to a different degree than the portion of the area obscured by the intruder, means for alternately exposing two portions of the surface of said element to an equal higher and lower light intensity, reactance means, power source means producing a reversing current co-ordinated with said light exposing means and said element and arranged to alternately charge opposite sides of said reactance means with current of opposite polarities upon alternate exposure of the two surface portions of said element, said element being connected to vary the current flowing through said reactance means in response to the light intensity on said surface, whereby said reactance means discharges to produce an output upon being charged unequally at opposite sides in sequence, and means responsive to the output of said reactance means for rendering an alarm.

References Cited
UNITED STATES PATENTS

| | | | |
|---|---|---|---|
| 2,227,147 | 12/1940 | Lindsay | 250—221 X |
| 3,222,529 | 12/1965 | Askowith | 250—206 X |
| 3,233,110 | 2/1966 | Senseney | 250—206 X |
| 3,278,923 | 10/1966 | Archer | 340—258 |

WALTER STOLWEIN, *Primary Examiner.*